UNITED STATES PATENT OFFICE.

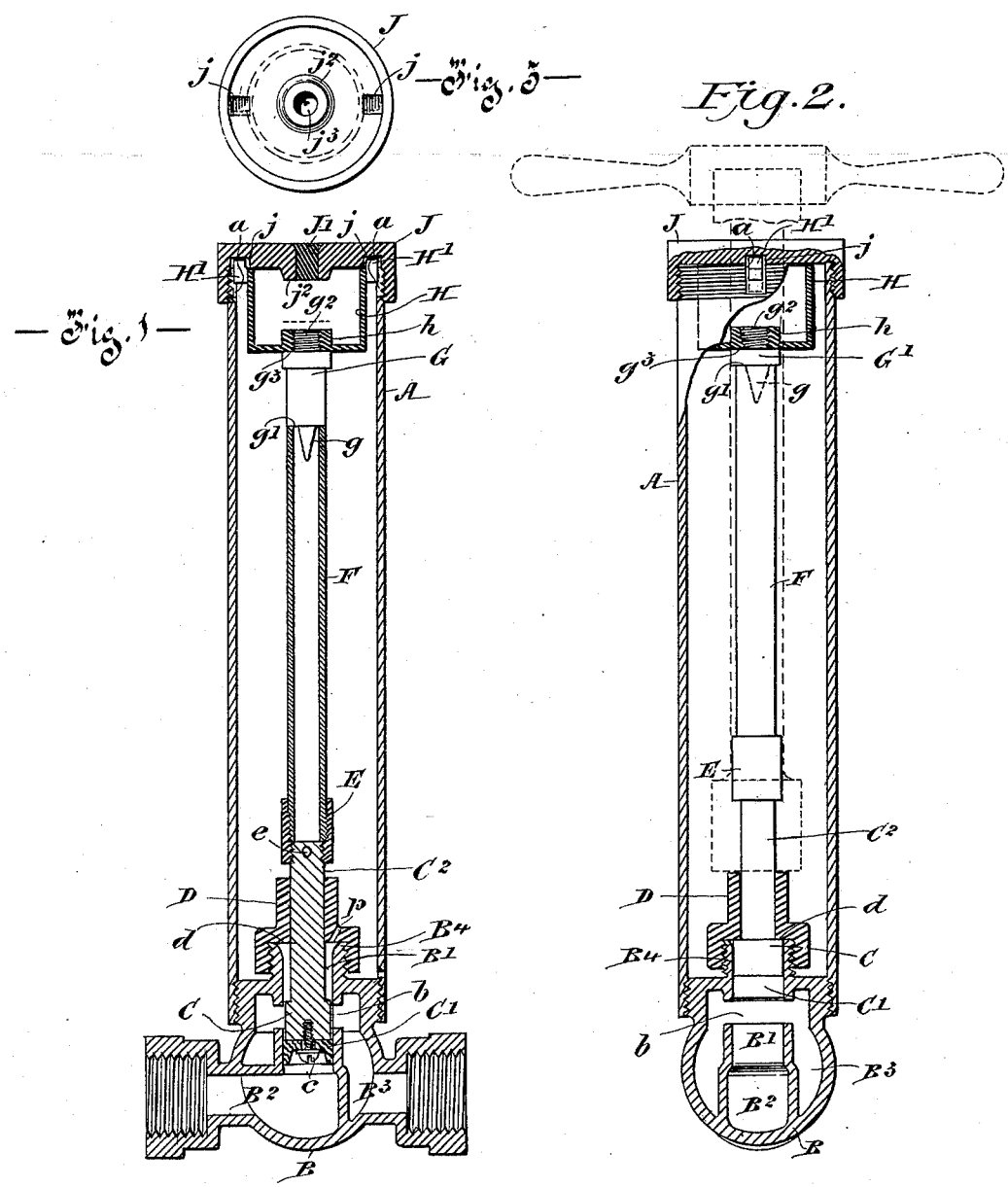

JOHN GEORGE SMITH, OF MONTREAL, CANADA.

STOP-COCK.

SPECIFICATION forming part of Letters Patent No. 509,628, dated November 28, 1893.

Application filed January 28, 1893. Serial No. 460,038. (No model.)

*To all whom it may concern:*

Be it known that I, JOHN GEORGE SMITH, of the city of Montreal, in the district of Montreal and Province of Quebec, Canada, have invented certain new and useful Improvements in Stop-Cocks; and I do hereby declare that the following is a full, clear, and exact description of the same.

This invention relates more particularly to what are known as buried street water stop cocks for controlling the branch water ways into dwellings and the like and has for its object to prevent any malicious interference with the same, or the operation thereof by other than authorized parties, and further to render the same rapid and automatic in their action, as well as to secure the convenient and ready repairing thereof.

My invention embraces first a construction of valve which allows the pressure of the water to effect the rapid and automatic opening thereof and the use of a permanent intermediate connection between the valve proper and the cap for closing the usual casing leading up from the valve, and such automatic operation of the valve renders possible a secret locking of the cap before mentioned, which secret locking is a second feature of my invention; while a third feature consists in the arrangement or use of parts whereby the valve can be readily removed from its seat for repairs without other derangement, or trouble, than the removal of the top cap and the insertion of a key or gripping instrument. For full comprehension however of the invention, reference must be had to the annexed drawings, forming a part of this specification, in which like symbols indicate corresponding parts and wherein—

Figure 1 is a sectional view of a complete buried street stop cock furnished with the automatically opening valve, the permanent intermediate connection between the valve proper, and a secret locking cap for closing the usual casing, the permanent intermediate connection being shown partly in elevation and partly in section and the secret locking cap also in section. Fig. 2 is a view of the same parts as in Fig. 1, the view being at right angles to that of Fig. 1 and giving a vertical section of the inclosing casing and the valve seat, an elevation of the permanent intermediate connection and a partial section of the secret locking cap. Fig. 3 is an interior view of the closing cap shown in Fig. 1.

Referring to Figs. 1, 2, and 3, A is the outer inclosing tube or casing, of the usual form and construction, to the bottom end of which the usual valve body B containing the valve is secured. The valve proper is formed of the piston or plunger portion C, and washer or "cup leather" C' secured to its end by screw $c$, or other means, and this valve is adapted to move up and down in the valve chamber or cylinder B' provided with apertures $b\ b$ connecting the inlet chamber $B^2$ with the outlet chamber $B^3$ of the valve body, the plunger portion C of the valve having an extension or neck piece $C^2$, of smaller diameter than the piston C, which has a sliding action in a bearing or sleeve section D the upper portion of which is squared on the outside, and the lower end of which is increased in diameter, the interior cavity enlarged and screw threaded to take onto an upward screw threaded projection $B^4$ of the valve cylinder B'. In some cases where the outlet apertures $b\ b$ from the valve chamber are increased in length to correspond with a larger size of valve, more than one flexible packing or "cup leather" will be found necessary. The shoulder $d$ of this sleeve section limits the upward automatic sliding action of the valve piston C and so allows the upper cap to be removed without any danger of the valve being thrown entirely out of its cylinder by the pressure of the water.

To the upper end of the piston extension $C^2$ is connected by any suitable joint connection, such as the screw threads shown on such extension and the pin $e$, a length of tubing F, also screw threaded at its end to receive the sleeve E, and the upper end of this tube receives the point $g$, and bears against the lower shoulder portion $g'$, of a screw plug G having a diminished screwed upper end $g^2$, projecting from an upper shoulder portion $g^3$, and adapted to take into a screwed hub or socket $h$ in the bottom of a box or cup H provided with lugs H' on its outside at the top. These lugs are adapted to fit slots or openings $a\ a$ in the upper end of the casing A and also to slip into and fit recesses $j\ j$ formed in the under side of the closing cap J which is screw threaded interiorly to take onto the screw threaded end of the casing A such cap also having a central hub portion $j^2$ provided with an aperture $j^3$, which aperture is, after all the parts have been arranged as circumstances may require, plugged with any suitable soft metal plug J'.

In Fig. 1 the valve is shown as closed, this having been accomplished by first the screwing of the plug G into place in the cup H while temporarily removed and any temporary device such as a piece of stick or rod inserted in the casing to hold the intermediate connection and valve down against the water pressure, after which the temporary rod is withdrawn and the point of the plug is inserted into the top end of the tube F, and the temporary rod again inserted temporarily through the aperture in the cap J while open to overcome the outward pressure from the water upon the valve and intermediate connection, in order to allow of the cap J being screwed in place upon the casing, this serving to depress the valve for a sufficient distance below the side openings from the valve cylinder to shut off the supply to the dwelling, and yet allow the pressure from the main to force upward the valve, intermediate connection and cup H so that the locking lugs H' of such cup could enter the recesses $j\ j$ in the cap J after which the aperture $j^3$ was plugged as before mentioned. It will thus be seen that the only way in which the valve can be opened is by driving the plug of soft metal through the aperture in the cap (it being caught by the cup H) and by again inserting a rod to depress the whole intermediate connection and with it the valve against the water pressure sufficiently to release the lugs H' from the recesses in the cap, unscrewing the cap, removing the cup and disconnecting the screw plug G and inserting in its place one G' of shorter length so that when the cup and cap are again placed in position the tube F and with it the valve will be elevated to a height sufficient to clear the side openings of the valve cylinder and allow the dwelling to be supplied.

To withdraw the valves from the cocks shown in Figs. 1, 2, and 3 it will be necessary to use a tubular key such as indicated by dotted lines in Fig. 2 in order to reach and rotate the sleeve sections D in these cases.

$p\ p$ are suitable apertures through the sleeve sections D adapted to allow of the drainage when desired of the house pipes.

What I claim is as follows:

1. In a buried street water cock, the combination with the inclosing shaft or tubular casing, of a closing cap for the open end of same having internal interlocking parts and an internal movable locking device also provided with interlocking parts to engage those of the cap, and operated by the water pressure of the main to effect the locking of said cap.

2. In a buried street water cock, the combination with inclosing shaft or tubular casing,—of a closing cap for the open end of same having internal interlocking parts and adapted, after being set in place, to be automatically locked against movement, and a movable locking device within said shaft or casing also provided with interlocking parts to engage those of the cap for effecting such locking.

3. In an inclosed street water cock, the combination with the inclosing casing of an interiorly locked cap, a sliding valve adapted to be opened and maintained in its open position by the water pressure upon same, and an intermediate connection, consisting of two or more adjustable or variable parts to render it variable as to length, between said valve and the cap of the inclosing casing for the purpose set forth.

4. In a street water cock, the combination with the valve cylinder,—of a sleeve bearing having a smooth inner surface an exterior portion shaped to receive a key, and a screw threaded connection with such cylinder; a valve having a solid cylindrical piston head and diminished stem portion, the former fitting and sliding within said cylinder and the latter adapted to slide in such bearing and the extent of upward movement of the said piston head being regulated by said sleeve bearing, and such valve and sleeve bearing being removable from said seat by the rotation of said bearing.

5. In a buried street water cock, the combination with an automatically operated valve located at the bottom of a shaft or tubular casing,—of an interiorly locked closing cap for the open end of such shaft or casing and an interior locking connection between said valve and cap for the purposes set forth.

6. In a buried street water cock, the combination with a sliding valve located at the bottom of a shaft or tubular casing and adapted to be operated to open by the water pressure upon the same,—of an interiorly locked closing cap for the open end of such shaft or casing, an upward extension from said valve, and locking parts carried by the upper end of said extension adapted upon the opening movement of the valve to connect with the lock against movement said closing cap as set forth.

7. In a buried street water cock, the combination with the vertically sliding valve located at the bottom of a shaft or tubular casing and adapted to be elevated by the water pressure beneath same, of an interiorly locked cap for the open top end of said shaft or casing, an upward extension from said valve variable as to length; and locking projections carried by the upper end of said extension adapted upon the elevation of said valve and extension to connect with and lock against movement said closing cap formed to receive such projections as set forth.

8. In a buried street water cock, the combination with the vertically sliding valve located at the bottom of a shaft or tubular casing,—of a closing cap for the open end of said shaft having an aperture adapted to receive a removable plug, an upward extension from said valve variable as to length and surmounted by a cup or like receptacle, locking lugs carried by said cup and recesses in the under side of said cap to receive said lugs, as set forth.

9. In a buried street water cock, the combination with the vertically sliding valve located at the bottom of a shaft or tubular casing, of a closing cap for the open end of said shaft or casing, an upward extension from said valve formed in parts, and a removable plug or section adapted to be inserted in said extension to form a part of and lengthen same, as set forth.

10. In a buried street water cock, the combination with the valve body having a valve chamber with vertical projection beyond said body; of a valve working on one stroke automatically in said chamber, a sleeve bearing or mounting with interior smooth boring, having an exterior narrowed head portion shaped to receive a key, and being removably connected with said projection, and the said valve having a stem or extension adapted to slide in said sleeve bearing or mounting, inlet and outlet to and from said chamber, and means for operating said valve, as set forth.

11. In a buried street water cock, the combination with the valve body, and having a valve chamber with vertical projection beyond said body; of a valve working on one stroke automatically in said chamber, a rotatable sleeve bearing or mounting with interior smooth boring, having an exterior narrowed head portion shaped to receive a key and being removably connected with said projection, and the said valve having a stem or extension adapted to slide in said sleeve bearing or mounting, inlet and outlet to and from said chamber, means for operating said valve, and the said rotatable bearing being adapted upon rotation in one direction to be disconnected from said valve body as set forth.

12. In a street water cock, the combination with the metallic shaft or tubular casing, inclosing the valve; of a removable closing cap for same, free from projections, depressions, or other means requisite to its removal and having an opening therein, and a drivable metal plug, also free from projections, depressions, or other means requisite to its removal, inserted in such opening and acting as a seal for the closing of same, for the purpose set forth.

13. In a street water cock, the combination with the metallic shaft or tubular casing, inclosing the valve; of a removable closing cap for same interiorly locked against movement, free from projections, depressions, or other means requisite to its removal and having an opening therein, and a soft metal plug also free from projections, depressions or other means requisite to its removal, inserted in such opening and acting as a seal for the closing of same for the purpose set forth.

14. In a buried street water cock, the combination with the vertically sliding valve located at the bottom of a shaft or tubular casing,—of a closing cap for the open end of said shaft, having an aperture adapted to receive a removable plug, and an intermediate connection between said valve and cap to lock the latter in place.

Montreal, 19th day of January, 1893.

JOHN GEORGE SMITH.

In presence of—
FRED. J. SEARS,
WILL P. McFEAT.